United States Patent
Sunaga et al.

[11] Patent Number: 5,942,066
[45] Date of Patent: Aug. 24, 1999

[54] PROCESS FOR PRODUCING LIQUID CRYSTAL DEVICE

[75] Inventors: Masaki Sunaga, Atsugi; Tetsuro Saito, Isehara; Issei Yonemoto, Yamato; Toshifumi Yoshioka, Hiratsuka, all of Japan

[73] Assignee: Canon Kabushiki Kaisha, Tokyo, Japan

[21] Appl. No.: 08/687,990

[22] Filed: Jul. 29, 1996

[30] Foreign Application Priority Data

Jul. 28, 1995 [JP] Japan .................................... 7-193828
Jul. 31, 1995 [JP] Japan .................................... 7-195384
Aug. 25, 1995 [JP] Japan .................................... 7-217850

[51] Int. Cl.$^6$ ............... B32B 33/00; B32B 17/10; G02F 1/1339
[52] U.S. Cl. ................ 156/102; 29/592.1; 156/583.4; 349/190
[58] Field of Search ................. 156/108, 102, 156/583.1, 583.4, 107, 109; 349/190; 29/592.1; 428/1

[56] References Cited

U.S. PATENT DOCUMENTS

| | | |
|---|---|---|
| 3,837,724 | 9/1974 | Haberland et al. ................ 29/25.13 |
| 3,909,930 | 10/1975 | Gurtler .............................. 29/592.1 |
| 4,626,303 | 12/1986 | Ogura ................................ 156/145 |
| 4,643,532 | 2/1987 | Kleiman ............................. 349/190 |
| 5,479,284 | 12/1995 | Watanabe et al. ................... 359/80 |
| 5,548,429 | 8/1996 | Tsujita ............................... 359/80 |
| 5,601,468 | 2/1997 | Fujii et al. .......................... 445/24 |

*Primary Examiner*—Francis J. Lorin
*Attorney, Agent, or Firm*—Fitzpatrick, Cella, Harper & Scinto

[57] ABSTRACT

A process for producing a liquid crystal device, including the steps of: providing a pair of electrode plates; disposing a sealing agent on at least one of the electrode plates so as to define a region to be filled with a liquid crystal; dispersing adhesive beads over at least one of the electrode plates; adhesively bonding the electrode plates to each other by curing the sealing agent and the adhesive beads under heating and pressure of the electrode plates. In the adhesively bonding step, the pair of electrode plates are provided with at least one heating member capable of setting a prescribed heating temperature for every prescribed region so as to cure the sealing agent and the adhesive beads. The above heating member is effective in improving an adhesive strength of the adhesive beads resulting in a good shock resistance of the resultant liquid crystal device and shortening a curing treatment time of the sealing agent.

25 Claims, 5 Drawing Sheets

PROCESS FOR PRODUCING LIQUID CRYSTAL DEVICE

FIELD OF THE INVENTION AND RELATED ART

The present invention relates to a process for producing a liquid crystal device, particularly a process for producing a liquid crystal device including a step of curing a sealing agent defining a region to be filled with a liquid crystal disposed between a pair of opposite electrode plates, and adhesive beads for bonding the electrode plates at respective points of the adhesive beads by using a heating member.

There has been known a liquid crystal device having a cell structure such that a pair of electrode plates (each comprising a substrate having thereon an electrode) are disposed opposite to each other via a sealing agent defining and surrounding a region (effective optical modulation or display region) in which adhesive beads are dispersed and a liquid crystal material is injected.

Such a liquid crystal device is generally required to have a good shock (impact) resistance. Particularly, a liquid crystal device using a chiral smectic liquid crystal is required to have a shock-resistant cell structure in order to allow a good alignment state to (chiral smectic) liquid crystal molecules since the liquid crystal molecules assume a smectic layer structure.

In a production process of such a liquid crystal device, the pair of electrode plates have been adhesively bonded to each other via a thermosetting sealing agent and thermosetting adhesive beads, after superposing the electrode plates with each other in good alignment, by curing or thermosetting the sealing agent and adhesive beads in an oven set to have a temperature of 100–200° C. while applying a pressure of 0.1–5.0 kg/cm$^2$ to the entire surface of the electrode plates in order to suppress deformation (or distortion) of the electrode plates. In this case, pressure application for the purpose of suppressing deformation of the electrode plates may generally be performed by using pressing members (pressing means), such as a weight for exerting a prescribed load on the entire surface of the electrode plate, one utilizing air pressure, and one utilizing spring load.

Such pressing members for suppressing deformation of the electrode plates per se have a large heat (thermal) capacity, so that, for example, when a pair of electrode plates set within an air pressure-pressing member is placed and heated in an oven set to have a temperature of 160° C., the heating operation takes about 3 hours to provide the electrode plate with a temperature of 150° C. Further, a heating rate (temperature-increasing rate) in an oven varies depending on various factors including the size and number of the electrode plates used, an applied pressure, and a pressing member used but may generally be about 0.3–0.7° C./min., e.g., in the case of heating a 500 mm×500 mm substrate to cure a sealing agent and adhesive beads.

In such a curing step of the sealing agent and adhesive beads at a very slow heating rate (0.3–0.7° C./min.), there arise the following problems (1) and (2).

(1) In case where thermosetting adhesive beads comprising, e.g., a hardener (curing agent) and an epoxy resin component, a curing reaction of the epoxy resin with the hardener proceeds before these adhesive beads are sufficiently molten or fused not to cause wetting at boundaries (contacting points) between the adhesive beads and the electrode plates, thus failing to provide a sufficient adhesive strength to the adhesive beads. In this case, a resultant liquid crystal device, particularly a chiral smectic (or ferroelectric) liquid crystal device using a chiral smectic liquid crystal material, is liable to lower its shock (impact) resistance.

(2) Curing of an ordinary sealing agent for a liquid crystal cell is generally required to effect a heat treatment for about 1 hour at about 150° C. although conditions for heat treatment vary depending on materials used for the sealing agent. If the curing is performed under the above-described heating conditions in the case of using the oven, an entire curing operation takes a long time as a total treating time in which the electrode plates are placed and retained in the oven (i.e., a time from immediately after the electrode plates are placed in the oven until the electrode plates are taken out from the oven) because it is necessary to effect a prescribed curing operation in the oven including a temperature-increasing step for about 3 hours, a heat treatment step for about 1 hour, and a cooling step for a certain time.

Further, the curing operation in the oven as described above requires a large-sized pressing member and a large-sized oven in case where electrode plates having a large size are heat-treated under application of a certain pressure, thus resulting in high production costs.

SUMMARY OF THE INVENTION

An object of the present invention is to provide a process for producing a liquid crystal device capable of improving an adhesive strength of adhesive beads and reducing a curing treatment time of a sealing agent for a liquid crystal cell.

According to the present invention, there is provided provided a process for producing a liquid crystal device, comprising the steps of:

providing a pair of electrode plates, disposing a sealing agent on at least one of the electrode plates so as to define a region to be filled with a liquid crystal, dispersing adhesive beads over at least one of the electrode plates, adhesively bonding the electrode plates to each other by curing the sealing agent and the adhesive beads under heating and pressure of the electrode plates, wherein, in the adhesively bonding step, the pair of electrode plates are provided with a heating member so as to heat the pair of electrode plates to cure the sealing agent and the adhesive beads.

In one of preferred embodiments of the present invention, the above production process of the liquid crystal device employs a heating member capable of setting a prescribed heating temperature for every prescribed region as the heating member provided to the electrode plates.

In another preferred embodiment, the heating member provided to the electrode plate may be a planar heating member having a size and a shape corresponding to those of the electrode plates.

This and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, some preferred embodiments of the process for producing a liquid crystal device according to the present invention will be described specifically with reference to the drawings.

Figure 1:
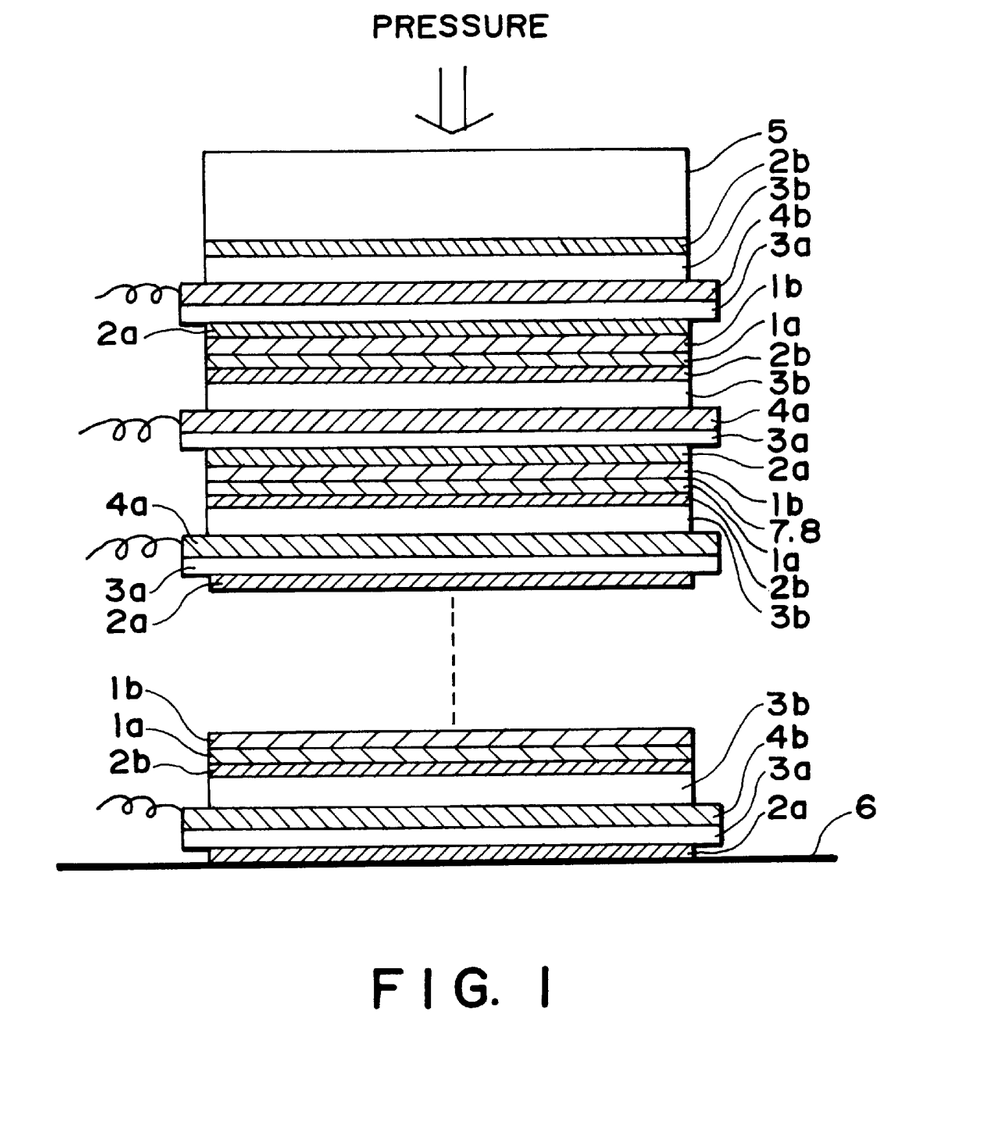
FIG. 1 is ai schematic sectional view for illustrating a curing (adhesively bonding) step of a sealing agent and adhesive beads adopted in the production process of a liquid crystal device according to the present invention.

FIG. 1 shows an embodiment of an arrangement of plural pairs of oppositely disposed electrode plates and members for heating and pressing the electrode plates in a curing step of a sealing agent and adhesive beads provided to each pair of electrode plates.

Referring to FIG. 1, a plurality of pairs (e.g., 20 pairs) of electrode plates 1a and 1b are superposed with each other with a prescribed spacing between a lower electrode plate 1a of one pair of electrode plates 1a and 1b among the plural pairs of electrode plates and an upper electrode plates 1b of another pair of electrode plates 1a and 1b located immediately below the above one pair of electrode plates 1a and 1b (on the drawing). In the prescribed spacing between the lower electrode plate 1a and the upper electrode plate 1b, a structural member (structural unit) comprising a buffering member 2a, a heat plate 3a, a planar heating member (planar heater) 4b (or 4a), a heat plate 3b and a buffering member 2b successively disposed in this order on the upper electrode plate 1b is disposed. The buffering member 2a (or 2b) may comprise, e.g., a sponge or felt material and may preferably have an area (planar area) at least including a sealing region (a region enclosed by a sealing agent, more preferably an area substantially identical to that of the electrode plate (1a, 1b). The heat plate 3a (or 3b) may comprise, e.g., copper or aluminum and may preferably have an area substantially identical to or somewhat larger than that of the electrode plate (1a, 1b). The planar heating member 4a (or 4b) may preferably be a member substantially free from surface unevenness and capable of raising a heating temperature up to about 200° C. Further, the planar heating member 4a (or 4b) may preferably have a heating region having an area substantially identical to or somewhat larger than the electrode plate (1a, 1b) and may more preferably have a heating region having an area substantially identical to that of the heat plate (3a, 3b).

The planar heating member 4b (or 4a) and the heat plate 3a disposed immediately under the planar heating member 4b (or 4a) may each preferably have a size somewhat larger than those of the electrode plates 1a and 1b. The buffering members 2a and 2b and the heat plate 3b disposed immediately on the planar heating member 4b (or 4a) may each preferably have a size substantially identical to those of the electrode plates 1a and 1b.

On the uppermost (top) pair of electrode plates 1a and 1b, a metallic member 5 for receiving air pressure, e.g., comprising an aluminum plate is disposed via the buffering member 2a, the heat plate 3a, the heating member 4b, the heat plate 3b and the buffering member 2b disposed in succession in this order. The metallic member 5 has a uniform thickness and can uniformly transmit a received air pressure to the electrode plates 1a and 1b.

Further, under the lowermost (bottom) pair of electrode plates 1a and 1b, a press table (stage) 6, e.g., comprising aluminum is disposed via the buffering member 2b, the heat plate 3b, the planar heating member 4b, the heat plate 3a and the buffering member 2a disposed in succession in this order (from the electrode plate side).

On at least one of confronting surfaces of the oppositely disposed electrode plates 1a and 1b, a layer of a sealing agent 7 for a liquid crystal cell, e.g., comprising a one component-type thermosetting epoxy resin is formed in a prescribed pattern by, e.g., printing so as to define a region to be filled with a liquid crystal. The pattern of the sealing agent 7 layer may preferably be in the form of a continuous line except for at least a portion providing an injection port (of a liquid crystal). Further, on the surface of the electrode plate 1a (or 1b) provided with (or not provided with) the sealing agent 7, adhesive beads 8, e.g., comprising a thermosetting epoxy resin are dispersed in a prescribed dispersion density so as to adhesively bonding the pair of electrode plates 1a and 1b at respective points of beads contacting the electrode plates in a region enclosed by the sealing agent 7.

The buffering members 2a and 2b are formed in a small thickness and function as means for uniformizing a pressure force due to air pressure exerted on the respective electrode plates 1a and 1b.

The heat plates 3a and 3b are disposed in order to uniformly transmit or conduct heat (energy) generated by the planar heating member 4 interposed between the heat plates 3a and 3b to the electrode plates 1a and 1b. Accordingly, the heat plates 3a and 3b are formed of, e.g., aluminum excellent in thermal conductivity. The heat plates 3a and 3b are connected with temperature sensors (not shown), respectively, as desired.

In a curing (adhesively bonding) step of the sealing agent 7 for a liquid crystal cell and the adhesive beads 8 in the process for producing a liquid crystal device according to the present invention described above, the sealing agent 7 and adhesive beads 8 disposed between each of the plural pairs of the electrode plates 1a and 1b are cured or hardened by conducting heat generated by the respective heating members 4a and 4b to the respective pairs of electrode plates 1a and 1b via the heat plates 3a and 3b and buffering members 2a and 2b concerned while exerting air pressure on the respective pairs of electrode plates 1a and 1b.

At this time, the respective heating members 4a and 4b may preferably be controlled to heat the respective pairs of electrode plates 1a and 1b (substantially the respective heat plates 3a and 3b) at a heating rate of 1.0–4.0° C./min., more preferably about 3.0° C./min.

As described above, the buffering members 2a and 2b are made thin and the heat plates 3a and 3b comprises a material showing a good thermal conductivity, so that heat generated by the heating members 4a and 4b can uniformly be transmitted to the electrode plates 1a and 1b with substantially no heat loss (heat dissipation).

In the above-described embodiment, the electrode plates 1a and 1b may be heated by the heating members 4a and 4b via the buffering members 2a and 2b without using the heat plates 3a and 3b. Further, depending on, e.g., shapes, sizes and materials of the electrode plates 1a and 1b arranged in superposition, heat dissipation (dispersion) is caused from peripheral ends thereof to lower a temperature of a peripheral portion of the electrode plate compared with that of a central portion of the electrode plate in some cases. As a result, a temperature (heat) distribution within the pair of electrode plates (or the liquid crystal cell) is liable to be ununiformized.

If a temperature distribution within the electrode plates becomes ununiform, uniform adhesive action of the adhesive beads is not readily performed, thus being liable to ununiformize adhesive strength of the adhesive beads.

In view of the above circumstances, a heating mechanism of the heating member (4a, 4b) may appropriately be designed.

Figure 2:
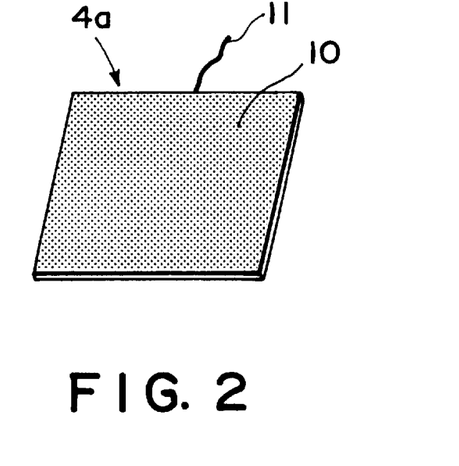
FIGS. 2 and 3 are each a schematic perspective view showing a structure of a planar heating member, respectively, used in the production process of a liquid crystal device of the present invention.

For example, in the above embodiment shown in FIG. 1, each of the inner heating members 4a may have a planar heating portion (region) 10 the entire surface of which is uniformly heated and is connected with a temperature controller (temperature control unit) (not shown) via a lead wire 11 as shown in FIG. 2. By controlling the temperature controller based on temperature data from temperature sensors (not shown) attached to the heat plates 3a and 3b, it is possible to control amount of heat generation of the heating portion 10, thus adjusting a heating rate (temperature-increasing rate) of the electrode plates 1a and 1b (the heat plates 3a and 3b).

Figure 3:
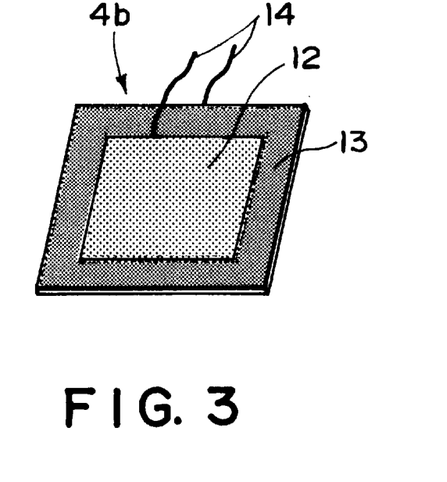

On the other hand, each of the outermost (top and bottom) heating members 4b in the embodiment of FIG. 1 may have a first planar heating portion (region) 12 and a second planar heating portion (region) 13 surrounding (enclosing) the first planar heating portion 12 as shown in FIG. 3. The first and second planar heating portions 12 and 13 are independently controlled, respectively, to generate heat, thus constituting the heating member 4b capable of setting different heating temperatures for different heating regions (first and second heating portions 12 and 13).

The heating member 4b has two planar heating portions (12 and 13 in FIG. 3) as described above but may have other shapes and three or more heating portions designed depending on the electrode plates to be heat-treated in view of a shape, a size, a temperature for heat treatment, and materials for the sealing agent 7 and the adhesive beads 8.

The first and second (planar) heating portions 12 and 13 are connected with a temperature controller (not shown) via lead wires 14, respectively, as shown in FIG. 3. By controlling the temperature controller based on temperature data from temperature sensors (not shown) attached to the heat plates 3a and 3b, it is possible to independently control amounts of heat generation of the first and second heating portions 12 and 13, thus adjusting heating rates (temperature-increasing rate) of the electrode plates 1a and 1b (the heat plates 3a and 3b).

In the process of the present invention, depending on, e.g., phases, sizes, and materials of the electrode plates used, it is preferred that an arrangement of the heating member 4a capable of effecting uniform heat generation at the entire region and the heating member 4b capable of setting a prescribed heating temperature for every prescribed region singly or in combination may appropriately be selected. More specifically, the latter heating member 4b may more preferably be arranged with respect to all the pairs of electrode plates 1a and 1b since a temperature distribution within the electrode plates during heating can more effectively be uniformized thereby to uniformly heat the electrode plates.

Further, in case where three or more heating portions are provided to the heating member 4b such that the respective regions are located from the inner side toward the outer (peripheral) side and are independently controllable. In this case, a temperature distribution with respect to the electrode plate is more effectively uniformized.

Into a gap (cell gap) of the thus prepared cell (black cell) including the pair of electrode plates 1a and 1b adhesively bonded to each other by the sealing agent 7 and the adhesive beads 8, a liquid crystal is injected at a prescribed temperature via an injection port where the sealing agent is not disposed. Thereafter, the injection port is sealed up with a sealing agent to prepare a liquid crystal device.

According to the above-described embodiment of the process for producing a liquid crystal device of the present invention, in the curing step of heating the adhesive beads and the sealing agent, it is possible to quickly apply and conduct heat from the planar heating member (4a, 4b) to the entire surface of the electrode plates (1a, 1b), whereby not only the sealing agent disposed at the peripheral portion of the electrode plates but also the adhesive beads dispersed within the peripheral portion are substantially heated homogeneously. As a result, the curing reactions of the adhesive beads and the sealing agent effectively proceed, respectively. Further, by using the heating member (4b as shown in FIG. 3) capable of setting a desired heating temperature for every prescribed region, it is possible to strictly uniformize a temperature distribution (i.e., effectively minimize a local temperature fluctuation), thus allowing uniform heating over an entire planar region of the electrode plates. As a result, the thus produced (final) liquid crystal device has a cell structure wherein a pair of electrode plates (1a, 1b) is adhesively bonded stably to each other by the adhesive beads together with the sealing agent, thus having an excellent shock (impact) resistance.

Hereinbelow, the present invention will be described more specifically based on example.

EXAMPLE 1

A blank cell (cell before injecting a liquid crystal) was prepared in the following manner.

On one of a pair of electrode plates (each composed of a 1.1 mm-thick glass substrate (300 mm×320 mm) and an about 700 Å-thick indium tin oxide (ITO) film formed thereon), a sealing agent for a liquid crystal cell (trade name: "Structbond XN-21-F", manufactured by Mitsui Toatsu Kagaku K.K.) was printed according to a screen printing method so as to form a continuous linear pattern except for a portion corresponding to an injection port of a liquid crystal, and thereafter, adhesive beads having an average particle size of about 5.6 $\mu$m (trade name: "Toraypearl Type III", mfd. by Toray K.K.) were dispersed at an average density of 170 particles/mm$^2$.

Separately, on the other electrode plate (having a structure identical to the above electrode plate), spacer beads as a spacer having an average particle size of about 1.04 $\mu$m (trade name: "Silica microbeads", mfd. by Shokubai Kagaku Kogyo K.K.) were dispersed at an average density of 300 particles/mm$^2$.

The thus-treated pair of electrode plates 1a and 1b were applied to each other (but not heated) to prepare a blank cell.

In a similar manner, 20 blank cells (20 pairs of electrode plates) in total were prepared.

The thus prepared 20 blank cells were arranged in superposition with each other between a metal member 5 (8 mm-thick aluminum plate) for receiving air pressure and a press table (stage) 6 via buffering members 2a and 2b, heat plates 3a and 3b, and heating members 4a and 4b as shown in FIG. 1.

More specifically, referring to FIG. 1, on the press table 6, a first structural member consisting of a 1 mm-thick buffering member 2a ("Everlight Scot Felt", mfd. by K.K. Bridgestone), a 1 mm-thick aluminum heat plate 3a, a planar heating member 4b ("SMICON 230", mfd. by Sakaguchi Dennetsu K.K.; wat density=1 W/cm$^2$), a 3 mm-thick heat plate 3b, and a 1 mm-thick buffering member 2b (the same as the buffering member 2a) successively disposed in this order from the press table 6 side was placed. On the buffering member 2b, a lowermost (bottom) pair of electrode plates 1a and 1b (blank cell before heat treatment) was disposed. On the lowermost electrode plates 1a and 1b, nineteen second structural members consisting of the members 2a, 3a, 4a (the same as the heating member 4b), 3b and 2b successively disposed in this order and 19 pairs of the electrode plates 1a and 1b are alternately superposed on each other, respectively, was placed. On the thus-arranged uppermost (top) pair of electrode plates 1a and 1b, a first structural member consisting of the members 2a, 3a, 4b, 3b and 2b disposed in superposition in this order was placed. Further, on the topmost buffering member 2, the metal member 5 was disposed.

The thus-arranged lamination structure including 20 pairs of electrode plates 1a and 1b was set within an air pressure-type pressing means generally including an outer pressure chamber provided with an air-introducing port and an inner rubber plate partitioning the pressure chamber (not shown). Then, the respective pairs of electrode plates 1a and 1b were heated by energizing the respective heating members 4a and 4b while applying an air pressure of 1 kg/cm$^2$ to the electrode plates 1a and 1b. At this time, each of the heating members 4a and 4b were controlled so as to provide the contacting heat plate (3a, 3b) with a heating temperature 160° C. by a temperature controller (not shown) connected to the heating member (4a, 4b) via a lead wire based on temperature data from a temperature sensor (not shown) provided to the heat plate (3a, 3b).

Heat from the respective heating members 4a and 4b was conducted to the respective electrode plates 1a and 1b via the corresponding heat plates 3a and 3b and the corresponding buffering members, respectively, so that the electrode plates 1a and 1b were heated to 150° C. in 10–15 minutes. Herein, the temperature of the electrode plates refers to that measured at positions of the heat plates 3a and 3b. Thereafter, the electrode plates 1a and 1b were kept at 150° C. for 1 hour and the power to the heating members 4a and 4b was disconnected to naturally cool the electrode plates 1a and 1b. Then, the plural pairs (20 pairs) of electrode plates 1a and 1b were taken out from the air pressure-type pressing means to complete a curing treatment of the sealing agent 7 and the adhesive bead 8.

One of the blank cells (the tenth pair from the bottom pair of electrode plates 1a and 1b) was cut so as to provide many 35 mm×35 mm sample cells. 7 sample cells (each size: 35 mm×35 mm) randomly selected from the cut sample cells were subjected to measurement of adhesive strength of the adhesive beads 8 according to a shearing method.

The results are shown in Table 1 below.

TABLE 1

| Sample No. | Adhesive strength (kgf) |
| --- | --- |
| 1 | 80.0 |
| 2 | 75.4 |
| 3 | 83.7 |

TABLE 1-continued

| Sample No. | Adhesive strength (kgf) |
| --- | --- |
| 4 | 76.1 |
| 5 | 60.4 |
| 6 | 85.9 |
| 7 | 84.3 |
| Average | 78.0 |

REFERENCE EXAMPLE 1

20 blank cells before heat (curing) treatment were prepared in the same manner as in Example 1.

These blank cells and buffering members (the same as in Example 1) were alternately superposed with each other, set within an air pressure-type pressing means (not shown) and placed in an oven.

After exerting an air pressure of 1.0 kg/cm$^2$ on the respective electrode plates 1a and 1b, the interior of the oven was kept at 160° C.

In this case, it took about 3 hours for the oven to heat the electrode plates up to 150° C. Thereafter, the electrode plates were retained at 150° C. for 1 hour, naturally cooled and taken out from the oven.

One of the plural pairs of electrode plates 1a and 1b (one blank cell) was cut and subjected to measurement of adhesive strength in the same manner as in Example 1.

The results are shown in Table 2 below.

TABLE 2

| Sample No. | Adhesive strength (kgf) |
| --- | --- |
| 1 | Not measurable[*1] |
| 2 | " |
| 3 | 49.5 |
| 4 | 47.7 |
| 5 | 56.1 |
| 6 | 78.4 |
| 7 | 73.6 |
| Average | 61.1[*2] |

[*1]: The electrode plates were separated from each other during the measurement.
[*2]: For Sample Nos. 3–7.

As apparent from comparison between the results of Tables 1 and 2, the adhesive beads 8 disposed between the electrode plates 1a and 1b constituting the blank cell prepared in Example 1 stably provides a high adhesive strength (shearing strength) for respective samples (Table 1) since heat from the heating members 4a and 4b is directly transmitted to the entire area of the electrode plates 1a and 1b via the heat plates 3a and 3b an the buffering members 2a and 2b to uniformize a temperature distribution within the electrode plates 1a and 1b, and the heating rate (temperature-increasing rate) is also relatively large.

On the other hand, the adhesive beads 8 subjected to curing in the oven adopted in Reference Example 1 have an excessively low adhesive strength portion due to an ununiform temperature distribution within the electrode plates (a higher temperature at the outer portion an a lower temperature at the inner portion) caused by heating in the oven and a slow heating rate, thus resulting in two unmeasurable samples (Sample Nos. 1 and 2) and a lower average adhesive strength (Table 2) than that of the adhesive beads in Example 1.

EXAMPLE 2 and REFERENCE EXAMPLE 2

Twenty (20) blank cells (for Example 2) were prepared in the same manner as in Example 1 except that adhesive beads were dispersed at an average density of 80 particles/mm$^2$.

Figure 4:
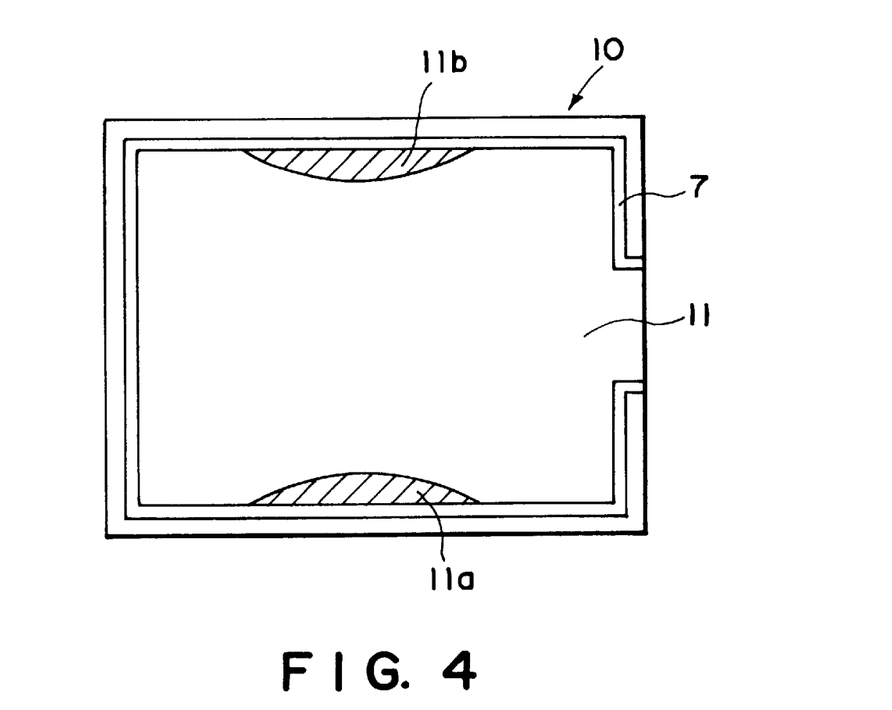
FIG. 4 is ia schematic plan view for illustrating disordered alignment (alignment defects) within a liquid crystal panel prepared in Reference Example 2 appearing hereinafter.

Into a gap between one pair of the electrode plates appropriately selected from the 20 pairs of the electrode plates, a pyrimidine-based ferroelectric liquid crystal material having a phase transition series (° C.) shown below was injected in an isotropic liquid state and gradually cooled to prepare a liquid crystal panel 10 having a display region 11 defined by the sealing agent 7 as shown in FIG. 4.

Phase transition temperature (°C.)

$$\text{Cryst.} \xrightarrow{-8.5} \text{SmC*} \xrightarrow{65} \text{SmA} \xrightarrow{88} \text{Ch.} \xrightarrow{94} \text{Iso.}$$

Cryst.: crystal phase, SmC*: chiral smectic C phase, SmA: smectic A phase, Ch.: cholesteric phase, and Iso.: isotropic phase.

On the other hand, 20 blank cell (for Reference Example 2) were prepared in the same manner as in Reference Example 1. By using one of the blank cell, a liquid crystal panel 10 (as shown in FIG. 4) was prepared in the same manner as in Example 2.

Each of the thus prepared liquid crystal panels (for Example 2 and Reference Example 2) was connected with an electric system and subjected to a shock resistance test (50G drop test), respectively, as follows.

Each of the liquid crystal panels (sample panel) is fixed on an aluminum fixing means provided with an acceleration sensor capable of measuring a value of G. The sample panel is dropped from a height of about 17–18 cm from a reference surface so as to exert an impact of 50G on the sample panel while keeping the sample panel in a state such that its display region is in parallel with the reference surface by using a drop impact tester (mfd. by Yoshida Seiki K.K.). Thereafter, when the sample panel is driven, an alignment state of the liquid crystal is observed with eyes.

As a result of the shock resistance test, the liquid crystal panel 10 for Example 2 did not show disordered alignment of liquid crystal molecules within the display region 11 but the liquid crystal panel 10 for Reference Example 2 showed disordered alignment at both side portions 11a and 11b (hatched portions) of the display region 11 as shown in FIG. 4.

As described above, according to the process of the present invention, it is possible to reduce the curing treatment time and improve a shock resistance of the liquid crystal panel (device) based on an increase in adhesive strength of the adhesive beads.

EXAMPLE 3

20 blank cells were prepared in the same manner as in Example 1 except that a pair of 500 mm×500 mm electrode plates 1a and 1b was used and conditions of the curing treatment were changed.

Figure 5:
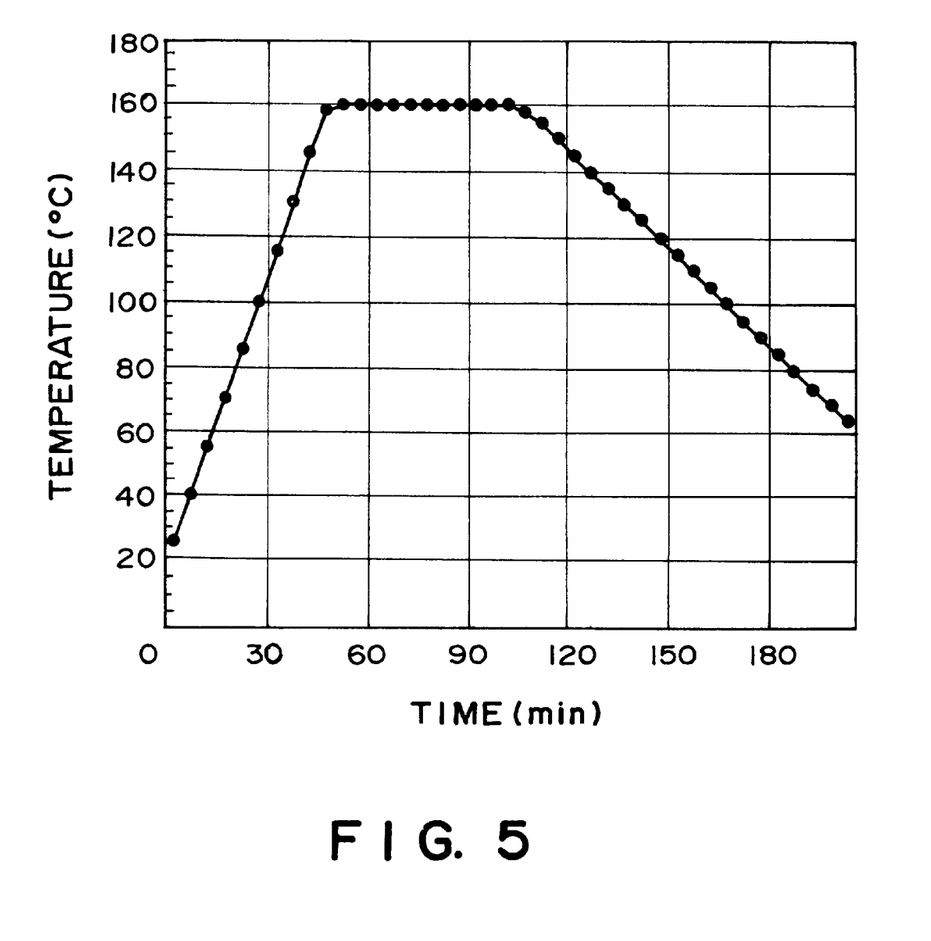
FIGS. 5 and 6 are graphs showing a heating condition in a curing step of a sealing agent and adhesive beads adopted in Example 3 and Reference Example 3, respectively.

The electrode plates 1a and 1b were heated from room temperature (25° C.) to 160° C. (in an about 45 min.) at a heating rate of 3.0° C./min., kept at 160° C. about 1 hour, and naturally cooled as shown in FIG. 5 by controlling a temperature controller based on temperature data from temperature sensors provided to heat plates 3a and 3b. Thereafter, the heat-treated electrode plates 1a and 1b were taken out from an air pressure-type pressing means.

Under the above conditions, 50 blank cells (50 pairs of electrode plates) were prepared similarly. All the sealing agents for the respective electrode plates had been cured while maintaining the initial printed pattern.

One of the blank cells was cut and subjected measurement of adhesive strength in the same manner as in Example 1.

The results are shown below.

TABLE 3

| Sample No. | Adhesive strength (kgf) |
|---|---|
| 1 | 77.5 |
| 2 | 63.8 |
| 3 | 84.0 |
| 4 | 74.2 |
| 5 | 86.2 |
| 6 | 81.4 |
| 7 | 80.1 |
| Average | 78.2 |

REFERENCE EXAMPLE 3

Figure 6:
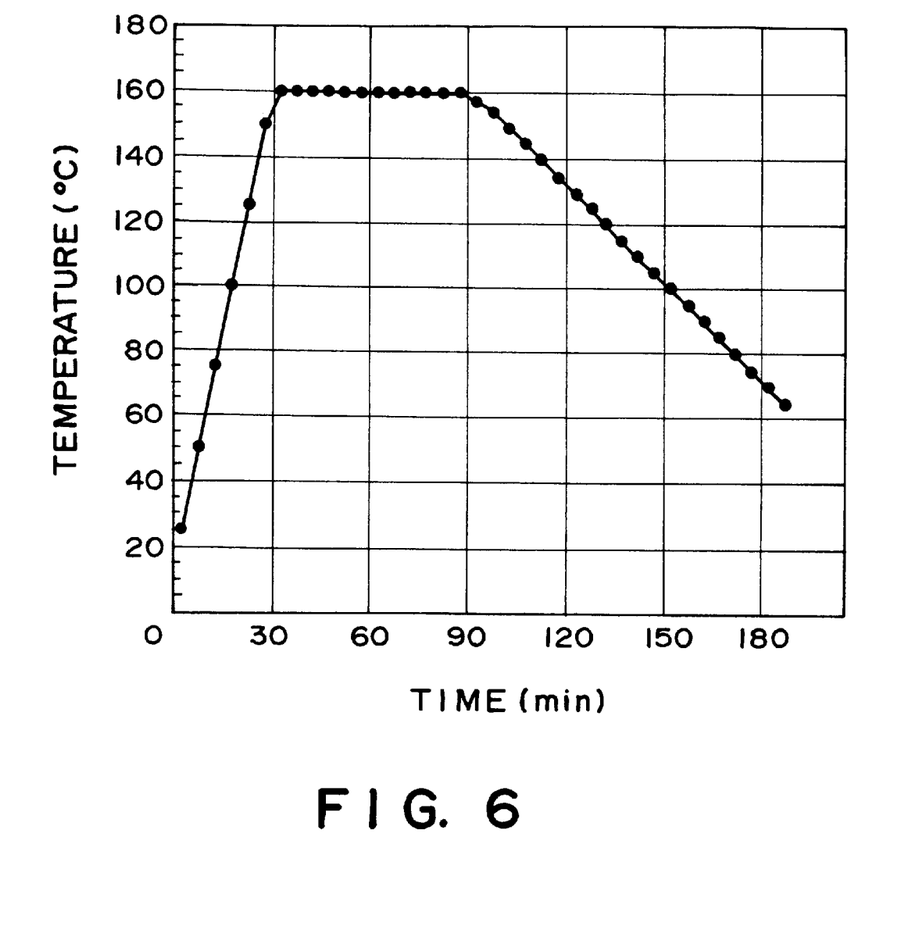

20 blank cells were prepared and evaluated in the same manner as in Example 3 except that electrode plates 1a and 1b were heated from room temperature (25° C.) to 160° C. (in about 30 min.) at a heating rate of 5.0° C./min. as shown in FIG. 6.

As a result of separate preparation of 50 blank cells (50 pairs of electrode plates), 18 pairs of electrode plates caused breakage of printed seal portion (seal breakage) due to an increased pressure during the curing treatment (curing step).

More specifically, in the curing step (heating and pressing step), when the electrode plates 1a and 1b are quickly heated by the heating member (e.g., at a heating rate of at least 5.0° C./min.), an air expansion speed by heating becomes larger than an air leak (release) speed from an opening (injection port) of the printed seal portion within the blank cell. For this reason, a pressure at a region enclosed by the seal portion between the electrode plates 1a and 1b is increased, thus being liable to locally break the seal portion. This seal breakage phenomenon leads to injection failure of a liquid crystal material to lower product yield.

The results of measurement of adhesive strength with respect to the blank cell wherein the sealing agent is well cured are shown in Table 4 below.

TABLE 4

| Sample No. | Adhesive strength (kgf) |
|---|---|
| 1 | 83.2 |
| 2 | 81.5 |
| 3 | 75.6 |
| 4 | 86.3 |
| 5 | 61.2 |
| 6 | 78.9 |
| 7 | 84.7 |
| Average | 78.8 |

As apparent from Table 3 (the case of a heating rate of 3.0° C./min. for Example 3) and Table 4 (the case of heating rate of 5.0° C./min., for Reference Example 3), the adhesive strengths of the adhesive beads used in Example 3 were substantially similar to those of the adhesive beads used in Reference Example 3. In other words, even when the heating rate was decreased from 5.0° C./min. to 3.0° C./min., the resultant adhesive strength was not substantially changed.

Further, when each of four sets of 20 blank cells were prepared and subjected to measurement of adhesive strength by setting a heating rate of 1.0–4.0° C./min. (specifically 1.0° C./min., 2.0° C./min., 3.0° C./min. and 4.0° C./min., respectively), resultant adhesive strengths were not substantially changed compared with those of Table 3 (Example 3) and no seal breakage was observed.

As described hereinabove, in case where the heating rate of the electrode plates during the curing treatment is 5.0°

C./min. (or above 5.0° C./min.), seal breakage is caused due to a pressure increase at the time of curing the sealing agent. On the other hand, the heating rate is set in a range of 1.0–4.0° C./min., whereby no seal breakage is confirmed to provide a sufficient adhesive strength.

Further, such a heating rate of 1.0–4.0° C./min. can particularly be readily controlled by using a planar heating member (4a, 4b) capable of conducting heat therefrom to the electrode plates 1a and 1b via the heat plates 3a and 3b and buffering members 2a and 2b. The heating rate of 1.0–4.0° C./min. by the heating member is higher than that by the oven, thus reducing a heating time (temperature-raising time).

In addition, the heating member has a size corresponding to (identical to or somewhat larger than) that of the electrode plate, thus not necessitating a large-size heating equipment, such as an oven to save production cost.

EXAMPLE 4 and REFERENCE EXAMPLE 4

20 blank cells were prepared in the same manner as in Example 3 (including the heating condition (heating rate: 3.0° C./min.) as shown in FIG. 5) and each filled with a pyrimidine-based ferroelectric liquid crystal in the same manner as in Example 2 to form 20 liquid crystal panels (devices) for Example 4.

These liquid crystal panels did not cause seal breakage due to pressure increase in the curing step of the sealing agent to allow a good liquid crystal injection operation.

Each of these liquid crystal panels was connected with an electric system and subjected to a shock resistance test in the same manner as in Example 2, whereby no disordered alignment of the liquid crystal within the panel was confirmed to provide excellent shock resistance.

Separately, 20 liquid crystal panels were prepared and evaluated in the same manner as in Example 4 above except that the heating condition (FIG. 5) was changed to that shown in FIG. 6 (heating rate: 5.0° C./min.).

As a result, 8 liquid crystal panels of 20 liquid crystal panels caused seal breakage thereby to result in injection failure of the liquid crystal. However, no disordered alignment was confirmed.

EXAMPLE 5

20 blank cells were prepared in the same manner as in Example 1 except that a curing treatment was performed by using a planar heating member 4a as shown in FIG. 2 effecting uniform heating in an entire heating region and a planar heating member 4b as shown in FIG. 3 capable of effecting temperature control for respective divided regions under heating conditions described below, respectively.

Each of the inner 18 blank cells (pairs of electrode plates 1a and 1b) was heated to 160° C. and kept at 160° C. (as temperature of heat plates 3a and 3b) for 45 min. by energizing a heating portion 10 of the heating member 4a.

On the other hand, each of the top and bottom blank cells was heated to 160° C. and kept at 160° C. for 45 min. by independently controlling and energizing a first heating portion 12 and a second heating portion 13 of the heating member 4b.

Incidentally, at this time, if each of the top and bottom blank cells is heated by using the heating member 4a as shown in FIG. 2, the top and bottom pairs of electrode plates 1a and 1b causes larger heat dissipation from each peripheral portion thereof compared with the inner 18 pairs of electrode plates 1a and 1b disposed between the top and bottom pairs of electrode plates 1a and 1b. More specifically, for example, in the top and bottom blank cells, the peripheral portion of the electrode plates shows a lower temperature than that of a central (or inner) portion of the electrode plates by, e.g., 4–5° C.

In this example, the first and second heating portions 12 and 13 were independently controlled while setting an amount of heat generation (evolution) of the second heating portion 13 so as to be higher than that of the first heating portion 12 to compensate peripheral heat dissipation, thus resulting in a narrower temperature distribution in a display region.

At the time of retaining these blank cells (20 parts of electrode plates 1a and 1b) at 160° C. for 45 minutes, these blank cells were subjected to measurement of a temperature distribution at respective substrate positions.

Figure 7:
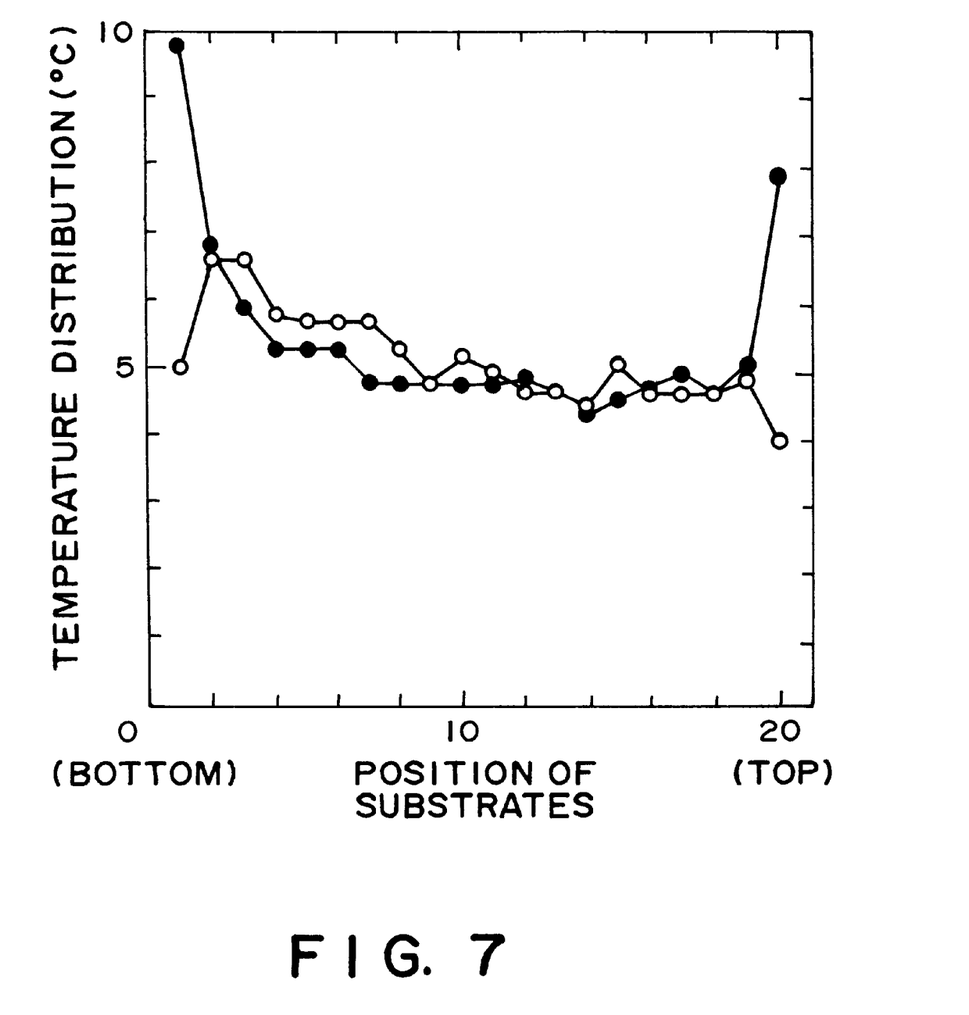
FIG. 7 is a graph showing a relationship between respective positions of plural pairs of electrode plates and corresponding temperature distributions (temperature fluctuation) in the respective positions.

The results are shown in FIG. 7.

FIG. 7 shows a temperature distribution with respect to 20 pairs of electrode plates indicated as a line connecting white dots (○) wherein an ordinate indicates a temperature difference or temperature distribution (taken as absolute value) between temperatures at positions each corresponding to the first and second heating portions 12 and 13, respectively, and an abscissa indicates the position of respective pairs of electrode plates 1a and 1b including the bottom pair thereof on the left side and the top pair thereof on the right side. FIG. 7 also include a temperature distribution data with respect to 20 pairs of electrode plates heat-treated by using only planar heating members 4a as a line connecting black dots (●).

More specifically, values of the temperature difference (distribution) are determined in the following manner.

Five temperature sensors are provided to a sample electrode plate (each of the electrode plates 1a and 1b) at a central portion corresponding to the first heating portion (12 in FIG. 3) and four corner portions corresponding to the second heating portion (13 in FIG. 3). Based on temperature data at the above five portions, a temperature difference (distribution) is obtained as a difference between a temperature value at the central portion and an average temperature value at the four corner portions (an average of four temperature values). In FIG. 7, the respective temperature distributions at respective substrate positions (from the bottom position to the top position) are indicated as the white dots and black dots, respectively.

As shown in FIG. 7, the electrode plates 1a and 1b heated by using only the heating members 4a provided a wider temperature distribution (temperature difference) of about 4.5–10° C., particularly about 8–10° C. at the top and bottom positions. On the other hand, the electrode plates 1a and 1b heated by using the heating members 4a and 4b in combination provided a narrower temperature distribution of about 4–6.8° C. at the respective positions. Further, particularly at the top and bottom positions, the electrode plates 1a and 1b were remarkably improved in temperature distribution, i.e., provided a narrower temperature distribution of about 4–5° C. which were about half of those in the case of using only the heating member 4a.

Accordingly, by using the heating members 4b with respect to the top and bottom pairs of electrode plates 1a and 1b wherein the first and second heating portions 12 and 13 were independently controlled with respect to an amount of heat generation to set a higher heat generation amount in a peripheral region and a lower heat generation amount in an inner region, it became possible to uniformize the temperature distribution of the electrode plates, thus allowing uniform heating, i.e., providing a uniform temperature over the entire region of the electrode plates.

As described hereinabove, according to the process for producing a liquid crystal device of the present invention, it is possible to uniformly heat an entire area of respective electrode plates and reduce a temperature-raising time by using a heating member attached to the electrode plates to effectively cure a sealing agent and adhesive beads. Consequently, the adhesive beads have a sufficient adhesive strength to provide the resultant liquid crystal device with an improved shock (impact) resistance. Further, the curing treatment time is reduced, thus improving product efficiency of the liquid crystal device. In addition, it is unnecessary to use a large-size heating equipment such as an oven as in a conventional process by using a heating member having a size substantially identical to or somewhat larger than that of the electrode plates, thus saving production costs.

The process according to the present invention is effective in reducing the curing treatment time while preventing seal breakage due to a larger pressure increase during the curing treatment by controlling a heating rate so as to be in a range of 1.0–4.0° C./min., thus ensuring a sufficient adhesive strength of the adhesive beads to stably prepare a high-performance liquid crystal device.

Further, by employing a heating member capable of setting desired heating temperatures for every prescribed (plural) regions, it is possible to effectively perform heating of the electrode plates so as to suppress a temperature lowering due to heat dissipation (dispersion) from a peripheral region thereof, i.e., so as to set a heat amount in the peripheral portion higher than that in a central region of the electrode plate. As a result, it becomes possible to uniformly heat the electrode plates while uniformizing a temperature distribution (or minimizing a temperature fluctuation) at the time of the curing treatment of the electrode plates, whereby the electrode plates are adhesively bonded to each other at a uniform adhesive strength in an entire bonding region to provide a high-quality liquid crystal device.

What is claimed is:

1. A process for producing a liquid crystal device, comprising the steps of:

providing a pair of electrode plates, disposing a sealing agent on at least one of the electrode plates so as to define a region to be filled with a liquid crystal, dispersing adhesive beads over said region to be filled with a liquid crystal on at least one of the electrode plates, and adhesively bonding the electrode plates to each other by curing the sealing agent and the dispersed adhesive beads while heating and pressing the electrode plates, wherein, in the adhesively bonding step, the pair of electrode plates are provided with a planar heating member having a shape corresponding to those of the electrode plates so as to heat the electrode plates to cure the sealing agent and the adhesive beads, and said heating and pressing of the electrode plates are continued until the curing of the sealing agent and the adhesive beads is substantially completed.

2. A process according to claim 1, wherein the pair of electrode plates is interposed between two heating members via a heat plate for effecting uniform heating and a buffering member at both sides of the pair of electrode plates.

3. A process according to claim 1, wherein, in the adhesively bonding step, the pair of electrode plates provided with the sealing agent and the adhesive beads is provided in a plurality of pairs and the plural pairs of electrode plates are superposed with each other each via said heating member so as to heat the plural pairs of electrode plates to cure respective sealing agents and respective adhesive beads at the same time.

4. A process according to claim 1, wherein, in the adhesively bonding step, the pair of electrode plates provided with the sealing agent and the adhesive beads is provided in a plurality of pairs and the plural pairs of electrode plates are superposed with each other each via said heating member, a heat plate for effecting uniform heating and a buffering member so as to heat the plural pairs of electrode plates to cure respective sealing agents and respective adhesive beads at the same time.

5. A process according to claim 1, wherein, in the adhesively bonding step, the pair of electrode plates provided with the sealing agent and the adhesive beads is provided in a plurality of pairs; and each pair of electrode plates and a structural member comprising a first buffering member, a first heat plate for effecting uniform heating, said heating member, a second heat plate for effecting uniform heating, and a second buffering member successively disposed in this order are alternately superposed with each other so as to heat the plural pairs of electrode plates by respective heating members under application of air pressure to cure respective sealing agents and respective adhesive beads at the same time.

6. A process according to claim 5, wherein either one of the first and second heat plates has an area substantially identical to that of said heating member.

7. A process according to claim 5, wherein either one of the first and second heat plates has an area substantially identical to that of at least one of the pair of electrode plates.

8. A process according to claim 5, wherein at least one of the first and second buffering members has an area substantially identical to that of at least one of the pair of electrode plates.

9. A process according to claim 1, wherein the sealing agent comprises thermosetting epoxy resin.

10. A process according to claim 1, wherein the adhesive beads comprise epoxy resin.

11. A process according to claim 1, wherein, between the pair of electrode plates, spacer particles are disposed.

12. A process according to claim 1, wherein, in the adhesively bonding step, the pair of electrode plates is heated by said heating member at a heating rate of 1.0–4.0° C./min.

13. A process for producing a liquid crystal device, comprising the steps of:

providing a pair of electrode plates, disposing a sealing agent on at least one of the electrode plates so as to define a region to be filled with a liquid crystal, dispersing adhesive beads over said region to be filled with a liquid crystal on at least one of the electrode plates, adhesively bonding the electrode plates to each other by curing the sealing agent and the adhesive beads under heating and pressure of the electrode plates, wherein, in the adhesively bonding step, the pair of electrode plates are provided with a heating member capable of setting a prescribed heating temperature for every prescribed region so as to heat the pair of electrode plates to cure the sealing agent and the adhesive beads.

14. A process according to claim 13, wherein said heating member is a planar heating member having a shape corresponding to those of the pair of electrode plates.

15. A process according to claim 14, wherein said planar heating member has a first region having a center thereof and a second region surrounding the first region and is capable of independently setting a heating temperature for each of the first and second regions; and, in the adhesively bonding step, a heating temperature in the second region is set so as to be higher than that in the first region.

16. A process according to claim 14, wherein at least one of the pair of electrode plates is provided with said planar heating member via a heat plate for effecting uniform heating and a buffering member.

17. A process according to claim 13, wherein, in the adhesively bonding step, the pair of electrode plates provided with the sealing agent and the adhesive beads is provided in a plurality of pairs and the plural pairs of electrode plates are superposed with each other each via a heating member so as to heat the plural pairs of electrode plates to cure respective sealing agents and respective adhesive beads at the same time.

18. A process according to claim 13, wherein, in the adhesively bonding step, the pair of electrode plates provided with the sealing agent and the adhesive beads is provided in a plurality of pairs and the plural pairs of electrode plates are superposed with each other each via a heating member, a heat plate for effecting uniform heating and a buffering member so as to heat the plural pairs of electrode plates to cure respective sealing agents and respective adhesive beads at the same time, the heating member including a heating member capable of setting a prescribed heating temperature for every prescribed region.

19. A process according to claim 13, wherein, in the adhesively bonding step, the pair of electrode plates provided with the sealing agent and the adhesive beads is provided in a plurality of pairs; each pair of electrode plates and a structural member comprising a first buffering member, a first heat plate for effecting uniform heating, a heating member, a second heat plate for effecting uniform heating, and a second buffering member successively disposed in this order are alternately superposed with each other so as to heat the plural pairs of electrode plates by respective heating members under application of air pressure to cure respective sealing agents and respectively adhesive beads at the same time; and the respective heating members includes an outermost heating member capable of setting a prescribed heating temperature for every prescribed region.

20. A process according to claim 19, wherein either one of the first and second heat plates has an area substantially identical to that of said heating member.

21. A process according to claim 19, wherein either one of the first and second heat plates has an area substantially identical to that of at least one of the pair of electrode plates.

22. A process according to claim 19, wherein at least one of the first and second buffering members has an area substantially identical to that of at least one of the pair of electrode plates.

23. A process according to claim 13, wherein the sealing agent comprises thermosetting epoxy resin.

24. A process according to claim 13, wherein the adhesive beads comprise epoxy resin.

25. A process according to claim 13, wherein, between the pair of electrode plates, spacer particles are disposed.

* * * * *

UNITED STATES PATENT AND TRADEMARK OFFICE
CERTIFICATE OF CORRECTION

PATENT NO.    : 5,942,066

DATED         : August 24, 1999

INVENTOR(S)   : Masaki Sunaga, et al.

It is certified that error appears in the above-identified patent and that said Letters Patent is hereby corrected as shown below:

COLUMN 2
   Line 62, "ai" should read --a--.

COLUMN 4
   Line 23, "to" should read --for--;
   Line 56, "comprises" should read --comprise--.

COLUMN 6
   Line 34, "example." should read --examples.--.

COLUMN 8
   Line 50, "an" should read --and--;
   Line 58, "an" should read --and--.

COLUMN 16
   Line 12, "includes" should read --include--.

Signed and Sealed this

Twenty-third Day of May, 2000

Attest:

Q. TODD DICKINSON

*Attesting Officer*      *Director of Patents and Trademarks*